(12) United States Patent
Kwon (10) Patent No.: US 9,575,852 B2
(45) Date of Patent: Feb. 21, 2017

(54) FAILURE RECOVERY APPARATUS OF DIGITAL LOGIC CIRCUIT AND METHOD THEREOF

(71) Applicant: ELECTRONICS AND TELECOMMUNICATIONS RESEARCH INSTITUTE, Daejeon (KR)

(72) Inventor: Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 16 days.

(21) Appl. No.: 14/749,558

(22) Filed: Jun. 24, 2015

(65) Prior Publication Data

US 2016/0019126 A1 Jan. 21, 2016

(30) Foreign Application Priority Data

Jul. 21, 2014 (KR) .......................... 10-2014-0092123

(51) Int. Cl.
*G06F 11/00* (2006.01)
*G06F 11/16* (2006.01)
*G06F 11/18* (2006.01)
*G06F 11/14* (2006.01)

(52) U.S. Cl.
CPC ......... *G06F 11/1641* (2013.01); *G06F 11/165* (2013.01); *G06F 11/1695* (2013.01); *G06F 11/183* (2013.01); *G06F 11/1438* (2013.01); *G06F 11/1658* (2013.01)

(58) Field of Classification Search
USPC ......................................................... 714/45
See application file for complete search history.

(56) References Cited

U.S. PATENT DOCUMENTS

| 7,146,530 | B2 | 12/2006 | Pomaranski et al. |
| 7,206,966 | B2 | 4/2007 | Barr et al. |
| 2003/0041301 | A1 | 2/2003 | Ryoo et al. |
| 2009/0006905 | A1* | 1/2009 | Luick .................. G06F 9/30101 714/52 |

(Continued)

FOREIGN PATENT DOCUMENTS

| KR | 10-2003-0017769 A | 3/2003 |
| KR | 10-2014-0039907 A | 4/2014 |

*Primary Examiner* — Sarai Butler (57) ABSTRACT

Exemplary embodiments of the present invention relate to a failure recovery apparatus of digital logic circuit and method thereof when a fault occurs in the digital logic circuit. A failure recovery apparatus according to an embodiment of the present invention comprises: a fault detection block configured to determine fault occurrence by comparing output results of a plurality of digital logic circuit which perform the same operation using a clock having a first cycle; and a failure recovery block configured to perform a failure recovery operation of the plurality of digital logic circuit by using a clock having a second cycle which is longer than the first cycle when it is determined as that a fault occurs. According to exemplary embodiments of the present invention, when a fault occurs in digital logic circuits due to external factors, it provides high reliability in failure recovery of the digital logic circuits.

16 Claims, 11 Drawing Sheets

(56) References Cited

U.S. PATENT DOCUMENTS

2010/0064287 A1* 3/2010 Bull ................. G06F 9/3836
718/102
2013/0151891 A1* 6/2013 Piry .................. G06F 11/0721
714/10
2014/0089731 A1 3/2014 Lee

* cited by examiner

FIG. 11

FAILURE RECOVERY APPARATUS OF DIGITAL LOGIC CIRCUIT AND METHOD THEREOF

CROSS REFERENCE TO RELATED APPLICATION

This application claims the benefit of Korean Patent Application No. 10-2014-0092123, filed on Jul. 21, 2014 entitled "Failure recovery apparatus of digital logic circuit and method thereof", which is hereby incorporated by reference in its entirety into this application.

BACKGROUND

1. Technical Field

Exemplary embodiments of the present invention relate to a failure recovery apparatus of digital logic circuit and method thereof when a fault occurs in the digital logic circuit.

2. Description of the Related Art

A CPU core means hardware or intellectual property (IP) which reads instructions stored in a storage such as a memory or a hard disk and executes an algorithm for a particular application, such as that executing a certain arithmetic operation to an operand according to operations encoded to the instructions and storing again the executed result.

Application range of the CPU core is extensive throughout the entire fields of system semiconductor. For example, application areas of the CPU core (processor core) have been extended from a high performance media data processing area for high performance multimedia data such as video/audio data compression and un-compression, audio data transformation and sound effects and a minimum performance microcontroller platform area such as modem for wire/wireless communication, voice codec algorithm, network data processing, touch screen, controller for home appliances, motor control and the like to device areas to which stable power supply or power supply from outside is impossible.

The CPU core is basically composed with a core, a translation lookaside buffer (TLB) and a cache. Operations to be performed by the CPU core are regulated with combination of a plurality of instructions. Instructions are stored in a memory and are inputted sequentially to the CPU core so that the CPU core can perform a particular operation every clock cycle. The TLB converts a virtual address to a physical address to perform operation system-based applications and the cache temporally stores the instructions, which are stored in an external memory, in an internal chip to increase speed of the CPU core.

In response to the development in driver assistance systems with a high level of intelligence and precision such as advanced drive assistance systems (ADAS) to the automate vehicle systems, importance of electronic systems has been increasing. Particularly, it is expected that applications using a CPU core having high performance of higher than 50 MHz-100 MHz, preferably 500 MHz or higher, may be significantly increased as a device to recognize external environments of a vehicle instead of a driver. Such applications may include motion detection of smart blackbox, pedestrian recognition during vehicle operation, driving assistance through driver's driving pattern or drowsiness recognition and lane detection. Thus, it must be able to analyze big data in real time using a CPU core having high performance to directly or indirectly involve in vehicle operation by recognizing external environments and analyzing the recognized video information, sound information and sensor information. Particularly, in case of lane detection-based driving assistance, the recognized result may have direct influence on a steering system and the like during vehicle operation. Vibrating a handle or restricting handle rotation angle or the like may be used to notify lane detection result to a driver as a method for providing direct influence to the steering system.

Reliability of the CPU core, which is a function to detect whether the CPU core operates normally or not, becomes more important for applications which recognize external environment data of a vehicle and have direct influence to the steering system of the vehicle. When any fault is caused in a semiconductor due to at least one factor of voltage, current and temperature, etc. under the condition that the recognized result directly affects the steering system of the vehicle, it may threat a driver's life. When such results of the CPU core affect the steering system, stability to ensure that the CPU core operates as it is intended may be very important.

SUMMARY

Exemplary embodiments of the present invention provide reliability of digital logic circuit such as CPU core and the like.

Exemplary embodiments of the present invention provide a stable failure recovery method of digital logic circuit when any fault occurs.

Exemplary embodiments of the present invention provide a method for improving reliability of failure recovery process of digital logic circuit.

A failure recovery apparatus of digital logic circuit comprises: a fault detection block configured to determine fault occurrence by comparing output results of a plurality of digital logic circuit which perform the same operation using a clock having the first cycle; and a failure recovery block configured to perform a failure recovery operation of the plurality of digital logic circuit by using a clock having the second cycle which is longer than the first cycle when it is determined as that a fault occurs.

The fault detection block may comprise a comparator configured to compare output logical values of the plurality of digital logic circuit, recognize as a fault occurrence when the output logical values are different, and report the fault occurrence to the failure recovery block.

The failure recovery block may comprise a failure recovery unit configured to be used for executing a program for failure recovery, wherein the failure recovery unit may comprise: a plurality of combinational logic circuit configured to perform a failure recovery operation; and a plurality of delay signal generator configured to output one logical value by receiving an output logical value of any one combinational logic circuit among the plurality of combinational logic circuit and N number of clocks having the second cycle in which N is a natural number.

The delay signal generator may comprise one flip-flop configured to receive the output logical value of any one combinational logic circuit and the clock having the second cycle. Here, the failure recovery block may further comprise a clock generator configured to generate the one clock having the second cycle.

The delay signal generator may comprise N number of flip-flops configured to receive the output logical value of any one combinational logic circuit commonly and receive any one among N number of clocks having phase difference each other; and a voter configured to receive output logical values of the N number of flip-flops and select and output a logical value corresponding to majority among the received output logical values. Here, the failure recovery block may further comprise a clock generator configured to generate the N number of clocks having the second cycle and phase difference each other. Here, phase difference between the $n-1^{th}$ clock in which $2 \leq n < N$ and the $n^{th}$ clock among the N number of clocks may be different from that between the $n^{th}$ clock and the $n+1^{th}$ clock.

The failure recovery unit may be positioned outside of the plurality of digital logic circuit.

The failure recovery unit may be positioned inside of any one of the plurality of digital logic circuit. Here, the failure recovery block may further comprise a clock generator configured to generate a clock having the first cycle to output it to the plurality of digital logic circuit before the fault is detected and to generate a clock having the second cycle to output it to the failure recovery unit after the fault is detected.

The failure recovery block may further comprise an initialization unit configured to initialize the plurality of digital logic circuit and the failure recovery unit when the fault is detected.

A failure recovery method of digital logic circuit according to an embodiment of the present invention may comprise: determining fault occurrence by comparing output results of a plurality of digital logic circuit which perform the same operation using a clock having the first cycle; and performing a failure recovery operation of the plurality of digital logic circuit by using a clock having the second cycle which is longer than the first cycle when it is determined as that a fault occurs.

According to exemplary embodiments of the present invention, when a fault is caused in digital logic circuit due to an external factor such as voltage, current, temperature and the like, it provides high reliability in failure recovery of the digital logic circuit.

According to exemplary embodiments of the present invention, it can minimize risk of fault during the failure recovery process.

DESCRIPTION OF THE EXEMPLARY EMBODIMENTS

Throughout the description of the present invention, when describing a certain technology is determined to evade the point of the present invention, the pertinent detailed description will be omitted.

Exemplary embodiments of the present invention provide a failure recovery method of digital logic circuit such as CPU core when a fault occurs.

According to exemplary embodiments of the present invention, any fault is detected by performing the same program in a plurality of digital logic circuit using the same clock and comparing the result to determine whether a fault occurs in the digital logic circuit.

Throughout the description of exemplary embodiments of the present invention, a case using two digital logic circuits is explained.

Exemplary embodiments of the present invention will be described with reference to the accompanying drawings.

Figure 1:
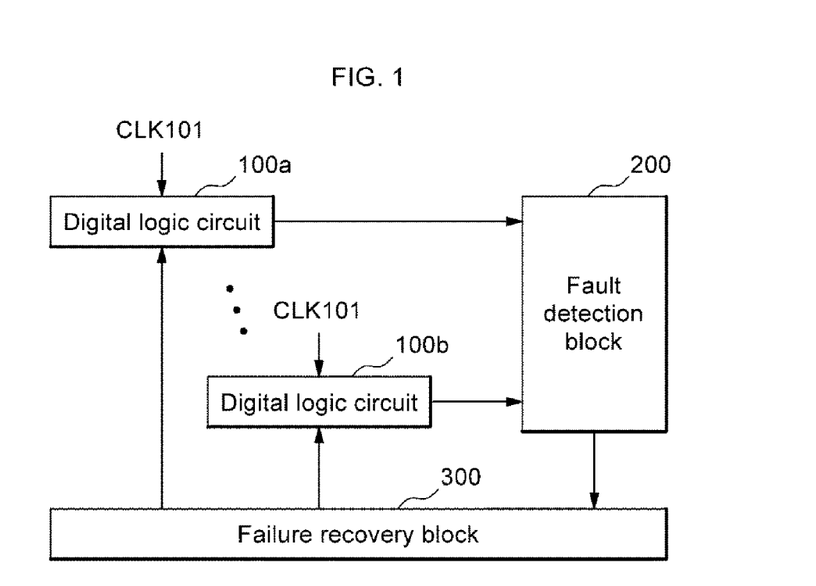
FIG. 1 is a block view illustrating a failure recovery apparatus of digital logic circuit according to an embodiment of the present invention.

FIG. 1 is a block view illustrating a failure recovery apparatus of digital logic circuit according to an embodiment of the present invention.

A digital logic circuit 100a and a digital logic circuit 100b are circuits executing the same application. The digital logic circuits 100a, 100b perform an arithmetic operation every clock, CLK 101, cycle and output performed arithmetic operation result.

In the description of exemplary embodiments of the present invention below, the clock, CLK 101, inputted to the digital logic circuits 100a, 100b has the first cycle.

A failure recovery apparatus of digital logic circuit according to an embodiment of the present invention includes a fault detection block 200 and a failure recovery block 300.

The fault detection block 200 may determine fault occurrence by comparing output results from the digital logic circuits 100a, 100b. When any fault is detected, the fault detection block 200 may report it to the failure recovery block 300. Here, the fault detection block 200 may further include a comparator (not shown) which receives and compares output logical values of the digital logic circuits 100a, 100b and recognizes as fault occurrence when the inputted output logical values are different. When any fault is detected, the comparator may report it to the failure recovery block 300.

When a report of the fault occurrence is received, the failure recovery block 300 performs a failure recovery operation of the digital logic circuits 100a, 100b by using a clock having the second cycle which is longer than the first cycle.

A fault associated with electro-magnetic interference (EMI) and the like usually disappears after a certain period of time. Thus, the failed digital logic circuit may be stably recovered when a clock having the cycle which is longer than fault time duration is used.

For example, the failure recovery may include code memory copy, core reset, memory value dump of check point and change of program counter (PC) value, etc. That is, the failure recovery may include a process till a core restarts by using PC values used prior to detecting any fault.

Figure 2:
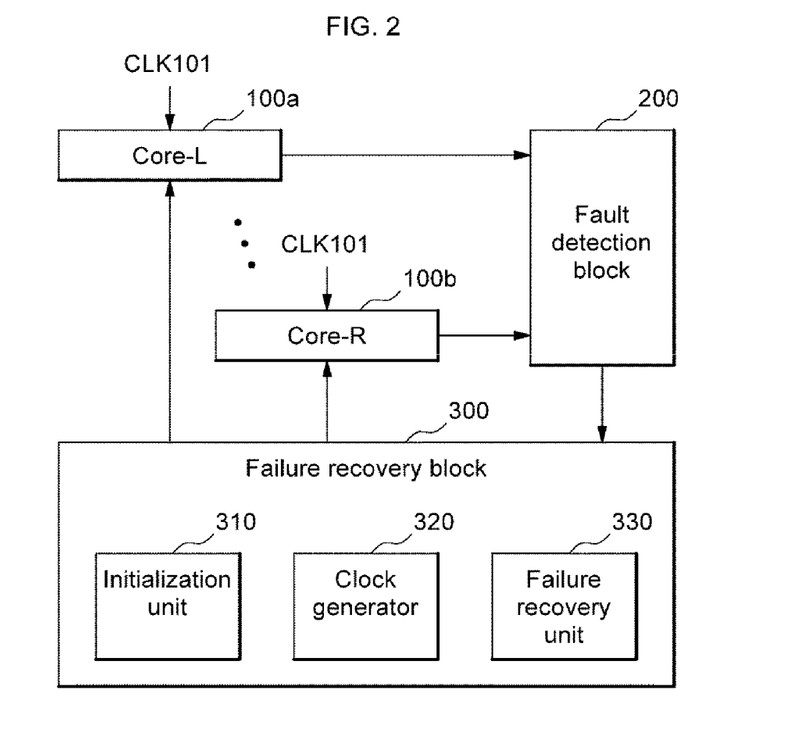
FIG. 2 is a block view illustrating a failure recovery block according to an embodiment of the present invention.

FIG. 2 is a block view illustrating a failure recovery block according to an embodiment of the present invention. It is assumed that the digital logic circuit is a CPU core when described with reference to FIG. 2.

Referring to FIG. 2, the failure recovery block 300 according to an embodiment of the present invention includes an initialization unit 310, a clock generator 320 and a failure recovery unit 330.

The initialization unit 310 initializes the core-L 100a and the core-R 100b when a report of fault occurrence is received from the fault detection block 200. Initialization may vary with system implementation. For example, initialization function may include initializing an application which the core-L 100a and the core-R 100b are to execute on a memory. Accordingly, operations of the core-L 100a and the core-R 100b may be stopped. The initialization unit 310 may also initialize the failure recovery unit 330.

When the initialization of the core-L 100a, the core-R 100b and the failure recovery unit 330 is completed, the initialization unit 310 may report it to the clock generator 320.

The clock generator 320 may generate a clock having the second cycle which is longer than the cycle of the clock, CLK 101, which is used for the core-L 100a and the core-R 100b to execute an application program and output the generated clock to the failure recovery unit 330.

The failure recovery unit 330 may execute a program for failure recovery of the core-L 100a and the core-R 100b by using the clock having the second cycle inputted from the clock generator 320.

Figure 3:
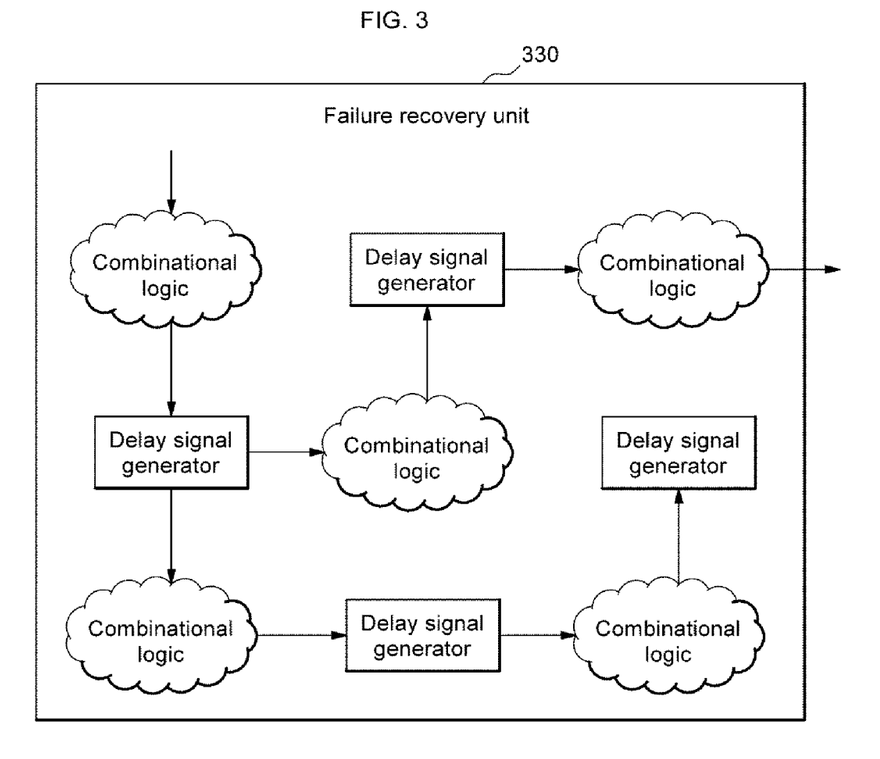
FIG. 3 is a block view illustrating a failure recovery unit according to an embodiment of the present invention.

FIG. 3 is a block view illustrating a failure recovery unit according to an embodiment of the present invention.

The failure recovery unit 330 according to an embodiment of the present invention may include a plurality of combinational logic circuit and a plurality of delay signal generator.

The combinational logic circuit may include at least one logic element and perform a program for failure recovery of the core-L 100a and the core-R 100b by using the logic elements. Result performed in each combinational logic circuit may be outputted to the delay signal generator.

The delay signal generator may receive a logical value outputted from the combinational logic circuit and N number of clocks having the second cycle outputted from the clock generator 320 in which N is a natural number, and output one logical value. The logical value outputted from the delay signal generator may be inputted to an adjacent combinational logic circuit and output of the combinational logic circuit may be inputted to an adjacent delay signal generator at the next cycle.

Figure 4:
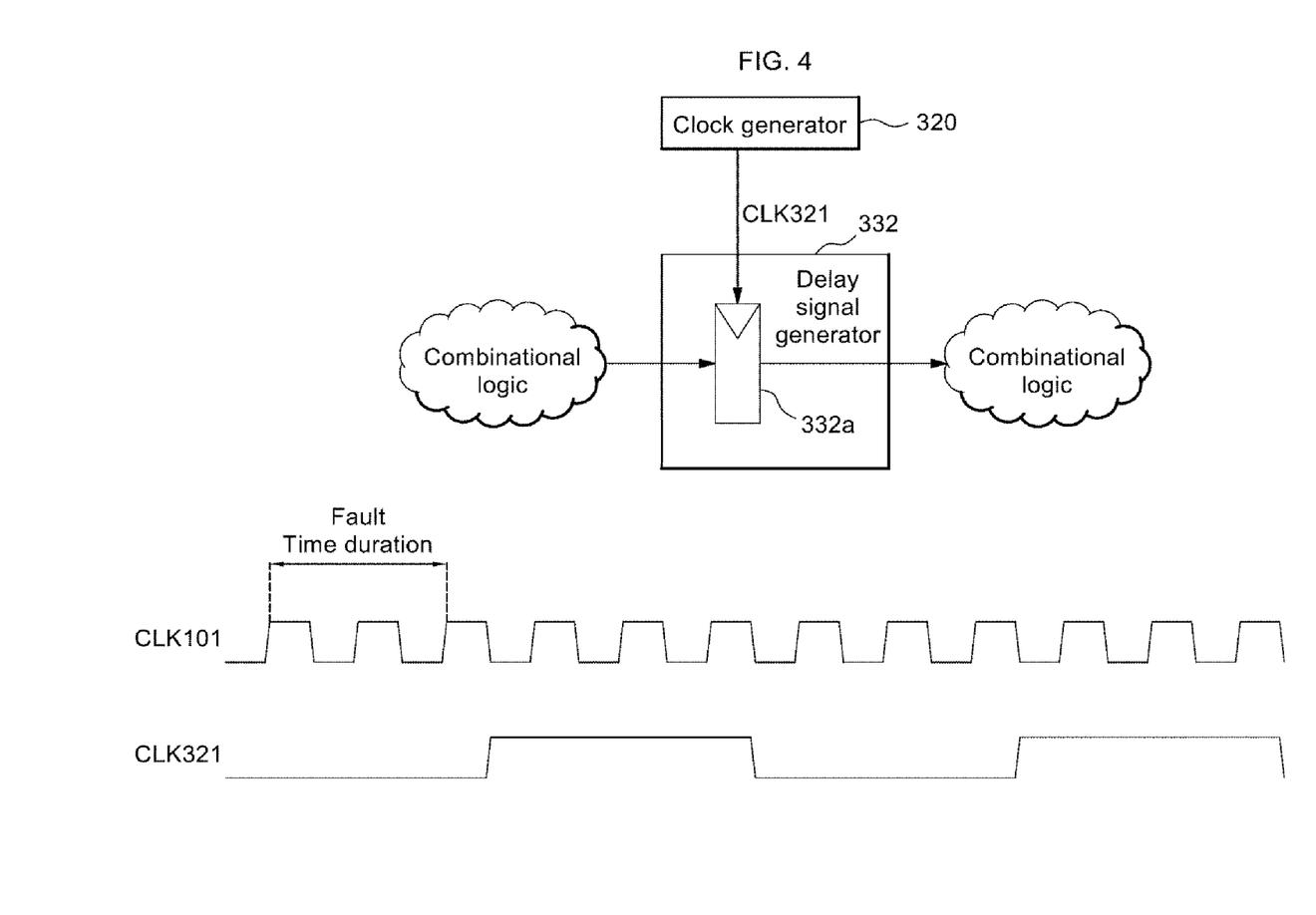
FIG. 4 illustrates a delay signal generator according to an embodiment of the present invention.

FIG. 4 illustrates a delay signal generator according to an embodiment of the present invention.

It is assumed that a delay signal generator 332 includes one flip-flop 332a when it is explained with reference to FIG. 4.

The flip-flop 332a may receive the logical value outputted from the combinational logic circuit which is positioned at the front end and the clock having the second cycle, CLK 321, outputted from the clock generator 320, and generate one logical value based thereon to output it to the combinational logic circuit which is positioned at the rear end.

As described above, a transient fault which is caused in circuits may generally have time duration of from several hundreds of picoseconds to several tens of nanoseconds and in exemplary embodiments of the present invention, the clock having the cycle which is longer than the time duration, CLK 321, is used to perform a program for failure recovery of the digital logic circuit.

On the other hand, such a fault may be caused on the flip-flop. According to another embodiment of the present invention, a plurality of flip-flop and a plurality of clock may be used to improve reliability of the failure recovery which will be explained with reference to FIG. 5.

Figure 5:
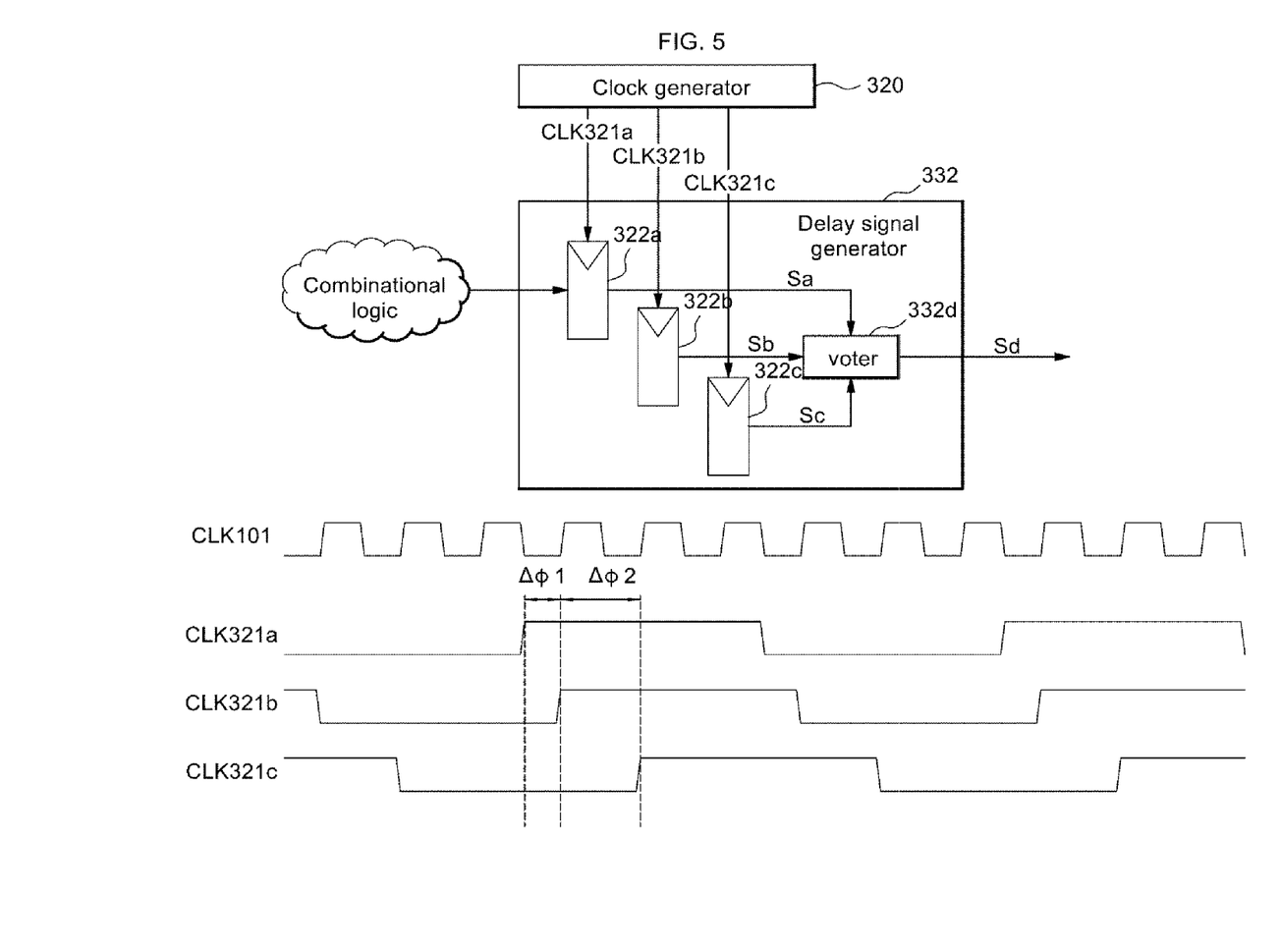
FIG. 5 illustrates a delay signal generator according to another embodiment of the present invention.

FIG. 5 illustrates a delay signal generator according to another embodiment of the present invention.

It is assumed that the delay signal generator 332 includes 3 flip-flops 332a, 332b, 332c when it is explained with reference to FIG. 5 but it may include 2 flip-flops or more than 3 flip-flops.

The flip-flops 332a, 332b, 332c may receive an output logical value commonly from the combinational logic circuit which is located at the front end and the flip-flops 332a, 332b, 332c may receive a clock having the second cycle CLK 321a, CLK 321b, CLK 321c, respectively. Accordingly, the clock CLK 321a having the second cycle may be inputted to the flip-flop 332a, the clock CLK 321b having the second cycle may be inputted to the flip-flop 332b, and the clock CLK 321c having the second cycle may be inputted to the flip-flop 332c.

The flip-flops 332a, 332b, 332c may generate output signals Sa, Sb, Sc based on the output logical value inputted from the combinational logic circuit and the inputted clocks. The flip-flops 332a, 332b, 332c may output the generated output signals to a voter 332d.

The voter 332d may select a plurality of logical value among logical values inputted from the flip-flops 332a, 332b, 332c and output the selected logical values. The voter 332d will be explained with reference to FIG. 7 below.

According to an embodiment described with reference to FIG. 5, when a fault occurs in any one of the flip-flops, a failure recovery operation may be performed by using the rest two elements.

In an embodiment, phase difference between clocks may be different. For example, phase difference ($\Delta\Phi1$) between the first clock CLK 321a and the second clock CLK 321b may be different from that between the second clock CLK 321b and the third clock CLK 321c. Thus, even though a fault occurs at the clock edge, reliability of the failure recovery operation may be ensured. The phase differences may be represented by the following Equation 1.

$$\text{the first cycle} \ll (\Delta\Phi1, \Delta\Phi2) \ll \text{the second cycle} \quad \text{Equation 1}$$

In an embodiment, the phase differences ($\Delta\Phi1$, $\Delta\Phi2$) may be set to be longer than time duration of transient fault which usually occurs. The phase differences ($\Delta\Phi1$, $\Delta\Phi2$) may be set based on experiments or based on generally known fact.

Figure 6:
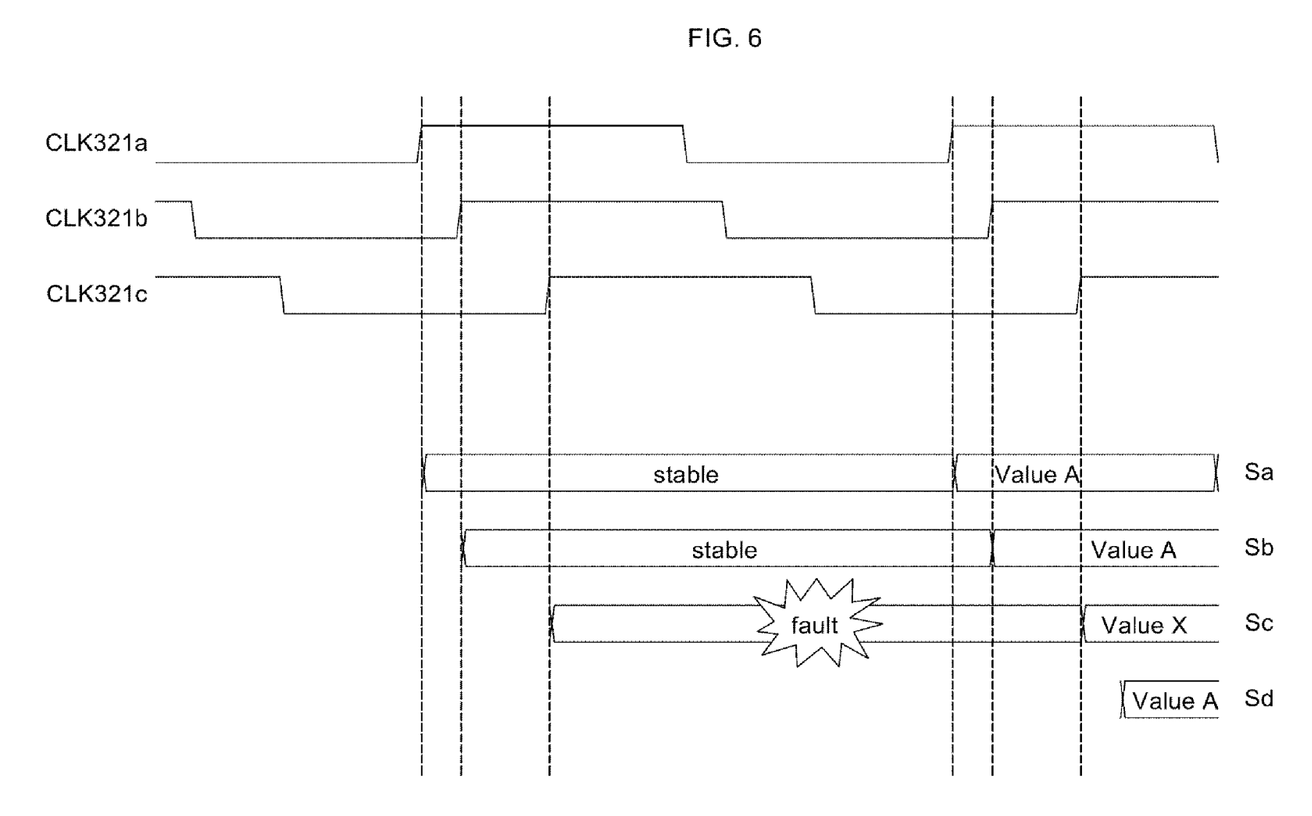
FIG. 6 illustrates signals inputted to and signals outputted from the delay signal generator shown in FIG. 5.

FIG. 6 illustrates signals inputted to and signals outputted from the delay signal generator shown in FIG. 5.

Referring to FIG. 5 and FIG. 6, even though a wrong operation value (Value X) is outputted due to fault occurrence in the flip-flop which receives the clock CLK 321c, it is noted that an operation value (Value A) outputted from the flip-flops which receive the rest clocks CLK 321a, CLK 321b may be selected and outputted as majority signal.

Figure 7:
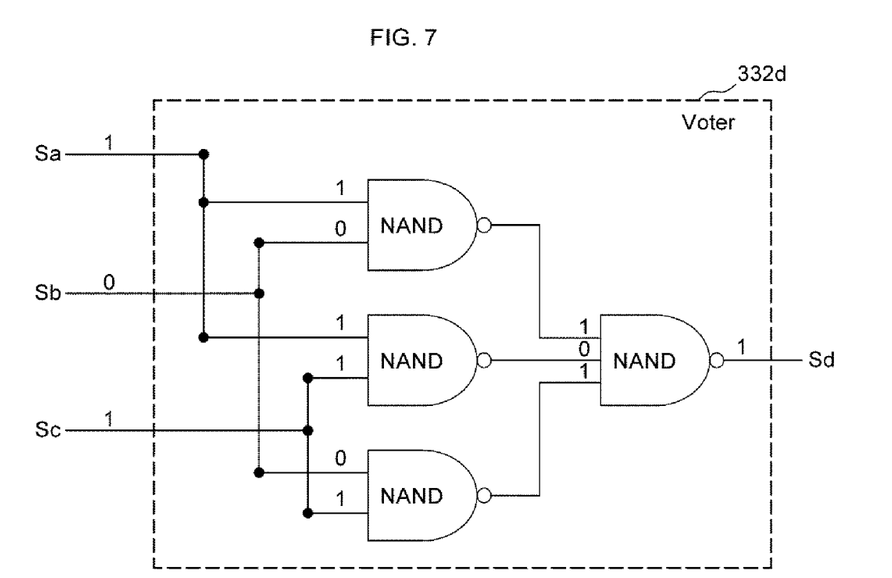
FIG. 7 illustrates a voter according to an embodiment of the present invention.

FIG. 7 illustrates a voter according to an embodiment of the present invention.

The voter 332d may be composed with a plurality of logic element. The voter 332d may select a majority signal from a plurality of inputted signal and output the selected signal. A voter composed with NAND gate is illustrated as an example in FIG. 7.

The case, that the failure recovery unit for failure recovery of digital logic circuit is positioned outside of the digital logic circuit in FIG. 1 and FIG. 2, has been explained but the failure recovery unit may be positioned inside of the digital logic circuit. This case will be explained with reference to FIG. 8 below.

Figure 8:
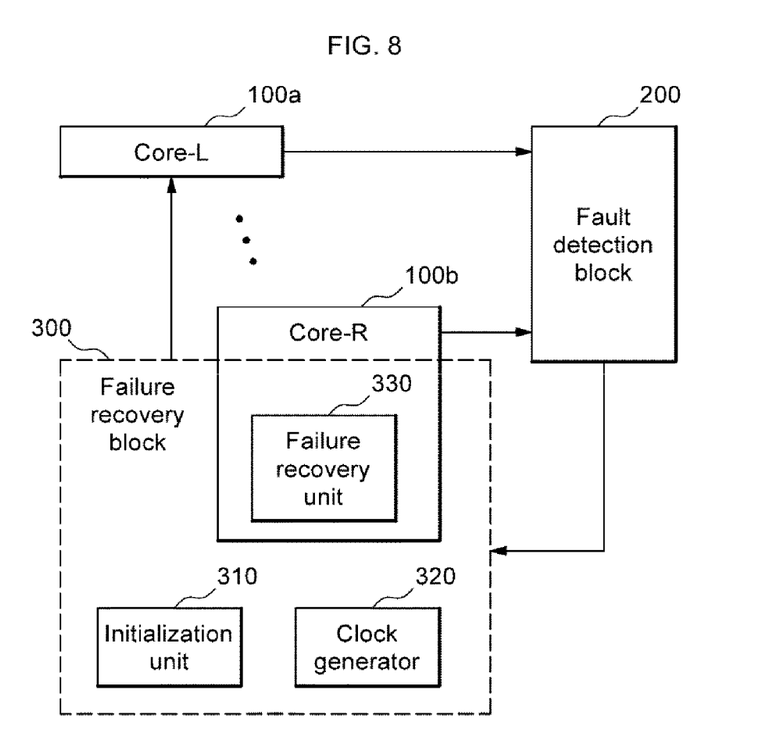
FIG. 8 is a block view illustrating a failure recovery apparatus of digital logic circuit according to another embodiment of the present invention.

FIG. 8 is a block view illustrating a failure recovery apparatus of digital logic circuit according to another embodiment of the present invention.

As shown in FIG. 8, the failure recovery unit 330 may be a part of combinational logic circuits which perform applications in the CPU core (core-L and core-R). In this case, the failure recovery unit 330 may perform applications during the CPU core operates normally but perform a program for failure recovery during the CPU core operates for failure recovery. This will be further explained with reference to FIG. 9 and FIG. 10.

Figure 9:
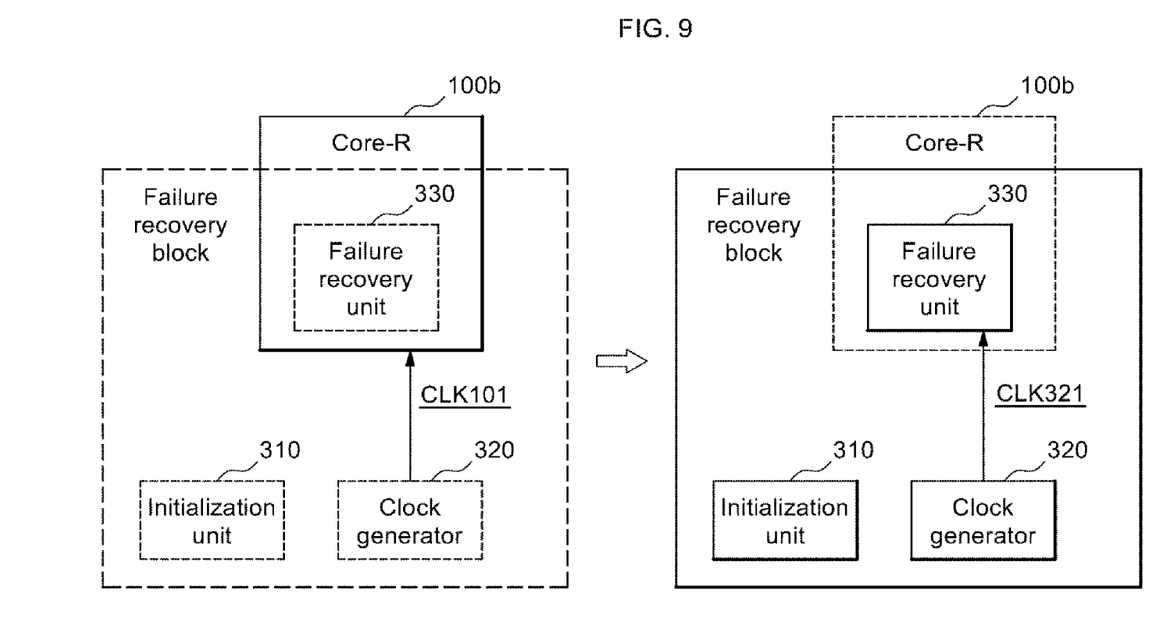
FIG. 9 and FIG. 10 illustrate a failure recovery unit according to another embodiment of the present invention.
Figure 10:
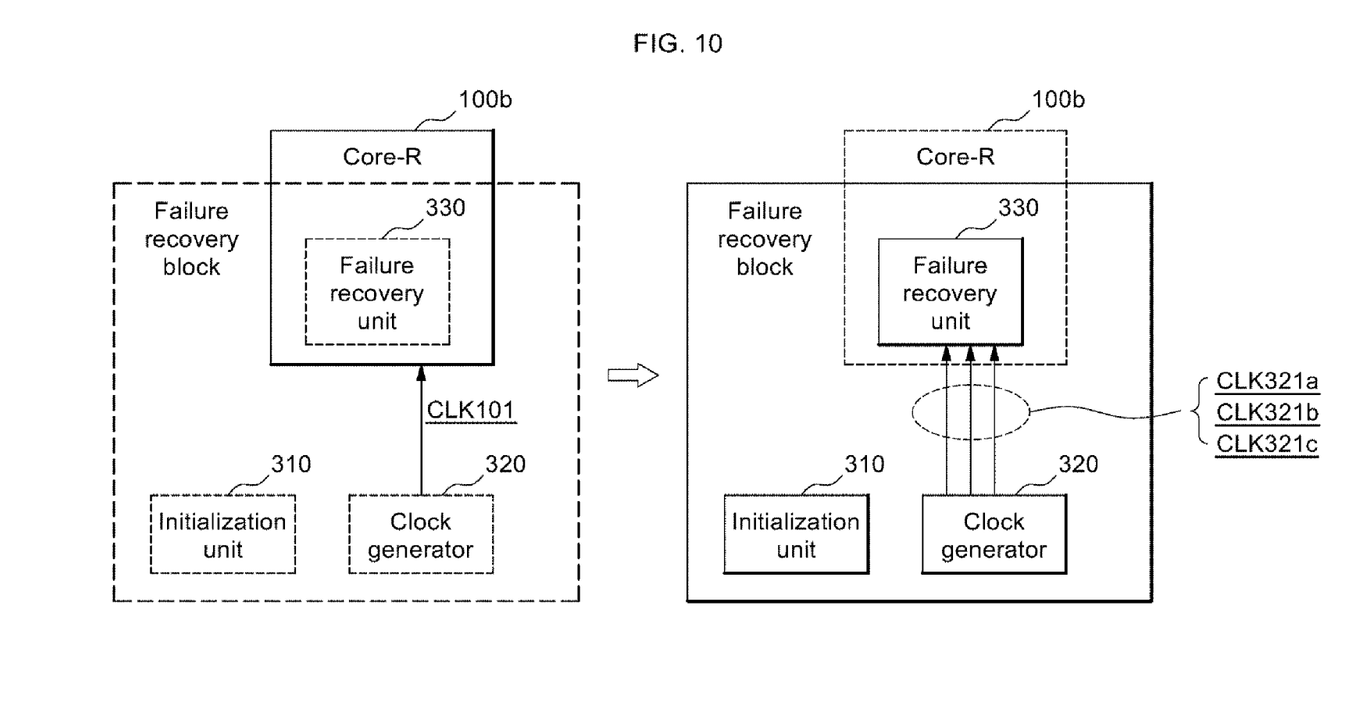

FIG. 9 and FIG. 10 illustrate a failure recovery unit according to another embodiment of the present invention.

The core-L and the fault detection block are omitted for convenience of description in FIG. 9 and FIG. 10.

As shown in FIG. 9, the failure recovery unit 330 may be installed inside the core-R 100b. The failure recovery unit 330 may perform applications during the CPU core operates normally but perform a program for failure recovery during the CPU core operates for failure recovery as described above.

The clock generator 320 may generate a clock, CLK 101, having the first cycle and output it to the core-R 100b when the CPU core operates normally.

On the other hand, when any fault is caused, thus initialization of the core-R 100b and the failure recovery unit 330 is performed and then completion of the initialization is received, the clock generator 320 may generate a clock, CLK 321, having the second cycle and output it to the failure recovery unit 330.

FIG. 10 illustrates an example using a plurality of clocks, CLK 321a, CLK 321b, CLK 321c having the second cycle. Detailed description is omitted since basic operations are the same as the embodiment described with reference to FIG. 9.

Figure 11:
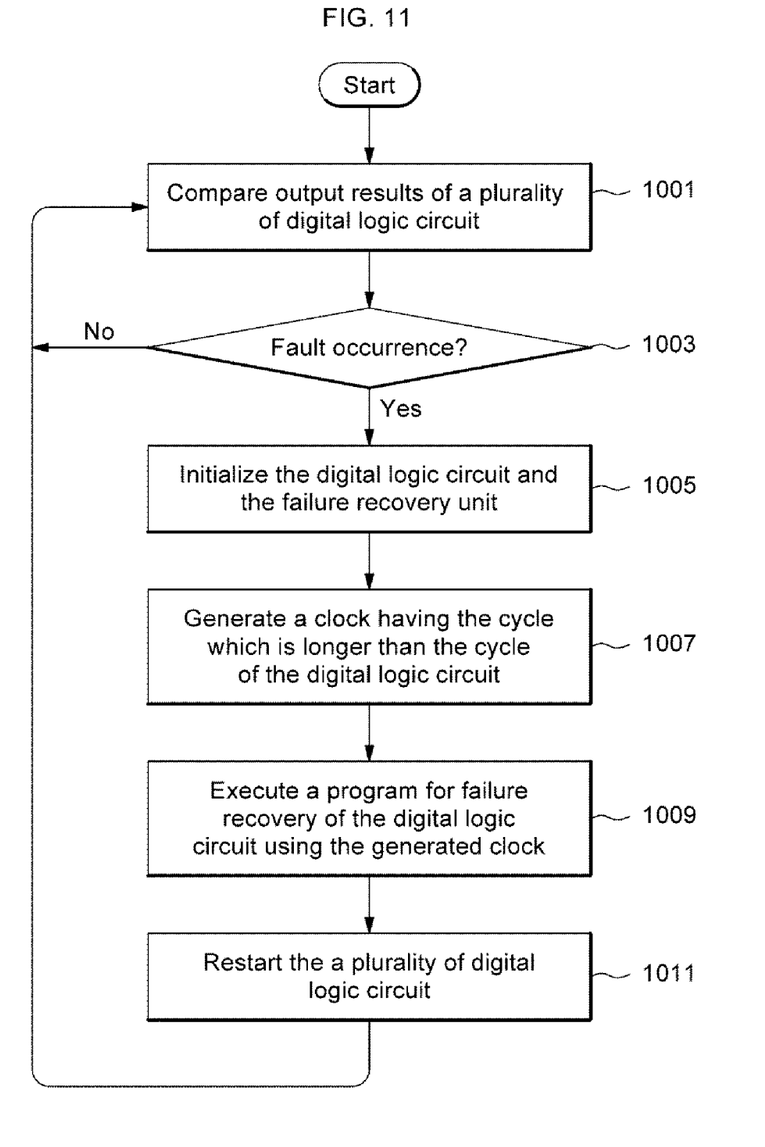
FIG. 11 is a block view illustrating a failure recovery method of digital logic circuit according to an embodiment of the present invention.

FIG. 11 is a block view illustrating a failure recovery method of digital logic circuit according to an embodiment of the present invention.

In Step 1001, output results of a plurality of digital logic circuit are compared. For example, an output logical value of the core-L and an output logical value of the core-R are compared. Such a comparison may be performed every cycle.

In Step 1003, it is determined if any fault is caused in digital logic circuits. For example, when an output logical value of the core-L is different from that of the core-R, it is determined as that a fault is caused. When it is determined as that a fault is caused, it may proceed to Step 1005.

In Step 1005, initialization of the digital logic circuit and the failure recovery unit is performed.

In Step 1007, a clock having the second cycle, which is longer than the first cycle used for performing applications in the digital logic circuit, may be generated. The clock having the second cycle may be one or more.

In Step 1009, a program for failure recovery of the digital logic circuit is executed using the clock having the second cycle.

In Step 1011, when execution of the program for failure recovery completes, the digital logic circuit may restart.

The exemplary embodiment of the present invention can be implemented by various methods. For example, the exemplary embodiment of the present invention can be implemented by using hardware, software or its combination. When they are implemented by software, they may be implemented as software executing in a plurality of processors using various operating systems or platforms. In addition, the software may be created by using any language among various appropriate programming languages or be compiled in machine language codes or intermediate codes executable in a framework or virtual machine.

In addition, when the exemplary embodiment of the present invention is executed in a plurality of processors, the exemplary embodiment of the present invention may be implemented by processor readable media such as a memory, a floppy disk, a hard disk, a compact disk (CD), an optical disk or a magnetic tape, or the like in which a plurality of programs are recorded to conduct the implementation of various exemplary embodiments of the present invention.

What is claimed is:

1. A failure recovery apparatus comprising:
 a fault detection block configured to determine an occurrence of a fault by comparing output results of a plurality of digital logic circuits, each of the plurality of digital logic circuits performing a common operation using a first clock signal having a first cycle; and
 a failure recovery block configured to perform a failure recovery operation of the plurality of digital logic circuits by using a second clock signal having a second cycle when the fault detection block determines that the fault has occurred, the second cycle of the second clock signal being longer than the first cycle of the first clock signal.

2. The failure recovery apparatus of claim 1, wherein the fault detection block comprises a comparator configured to compare output logical values of the plurality of digital logic circuits, recognize the occurrence of the fault when two or more of the output logical values are different, and report the occurrence of the fault to the failure recovery block.

3. The failure recovery apparatus of claim 1, wherein the failure recovery block comprises a failure recovery unit configured to execute a program for failure recovery, and
 wherein the failure recovery unit comprises:
 a plurality of combinational logic circuits each configured to perform a failure recovery operation; and
 a plurality of delay signal generators each configured to output a logical value by receiving a first output logical value of a corresponding one of the plurality of combinational logic circuits and N clock signals, each of the N clock signals having the second cycle, N being a natural number.

4. The failure recovery apparatus of claim 3, wherein one or more of the plurality of delay signal generators each comprise a single flip-flop, the single flip-flop being configured to receive a single clock signal having the second cycle.

5. The failure recovery apparatus of claim 4, wherein the failure recovery block further comprises a clock generator configured to generate the single clock signal having the second cycle.

6. The failure recovery apparatus of claim 3, wherein one or more of the plurality of delay signal generators each comprise:
 N flip-flops configured to commonly receive the first output logical value of the corresponding one of the plurality of combinational logic circuits and respectively receive the N clock signals, a pair of the N clock signals having a phase difference with respect to each other; and
 a voter configured to receive second output logical values of the N flip-flops, and output a logical value corresponding to a majority of the received second output logical values of the N flip-flops.

7. The failure recovery apparatus of claim 6, wherein the failure recovery block further comprises a clock generator configured to generate the N clock signals, any pair of the N clock signals having a phase difference with respect to each other.

8. The failure recovery apparatus of claim 6, wherein the N clock signals include an $n-1^{th}$ clock signal, an $n^{th}$ clock signal, and an $n+1^{th}$ clock signal, n being an integer that is equal to or greater than 2 and less than N, and
wherein a first phase difference between the $n-1^{th}$ clock signal and the $n^{th}$ clock signal is different from a second phase difference between the $n^{th}$ clock signal and the $n+1^{th}$ clock signal.

9. The failure recovery apparatus of claim 3, wherein the failure recovery unit is disposed outside the plurality of digital logic circuits.

10. The failure recovery apparatus of claim 3, wherein the failure recovery unit is disposed inside one of the plurality of digital logic circuits.

11. The failure recovery apparatus of claim 10, wherein the failure recovery block further comprises a clock generator configured to generate and output a generated clock signal having the first cycle to the plurality of digital logic circuits before determining that the fault has occurred and to generate and output a generated clock signal having the second cycle to the failure recovery unit after determining that the fault has occurred.

12. The failure recovery apparatus of claim 3, wherein the failure recovery block further comprises an initialization unit configured to initialize the plurality of digital logic circuits and the failure recovery unit when the fault detection block determines that the fault has occurred.

13. A failure recovery method comprising:
determining an occurrence of a fault by comparing output results of a plurality of digital logic circuits, each of the plurality of digital logic circuits performing a common operation using a first clock signal having a first cycle; and
performing a failure recovery operation of the plurality of digital logic circuits by using a second clock signal having a second cycle when it is determined that the fault has occurred, the second cycle of the second clock signal being longer than the first cycle of the first clock signal.

14. The failure recovery apparatus of claim 1, wherein the first cycle of the first clock signal corresponds to a single period of the first clock signal, and the second cycle of the second clock signal corresponds to a single period of the second clock signal.

15. The failure recovery apparatus of claim 6, wherein the voter includes a plurality of input NAND gates, each of the plurality of input NAND gates receiving a corresponding pair of the second output logical values of the N flip-flops, and
wherein the voter further includes an output NAND gate, the output NAND gate receiving third output logical values of the plurality of input NAND gates.

16. The failure recovery apparatus of claim 8, wherein both of the first phase difference and the second phase difference are longer than the first cycle and shorter than the second cycle.

* * * * *